(12) United States Patent
Phelps

(10) Patent No.: US 6,941,493 B2
(45) Date of Patent: *Sep. 6, 2005

(54) MEMORY SUBSYSTEM INCLUDING AN ERROR DETECTION MECHANISM FOR ADDRESS AND CONTROL SIGNALS

(75) Inventor: Andrew Phelps, Encinitas, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 409 days.

This patent is subject to a terminal disclaimer.

(21) Appl. No.: 10/084,105

(22) Filed: Feb. 27, 2002

(65) Prior Publication Data

US 2003/0163767 A1 Aug. 28, 2003

(51) Int. Cl.⁷ .............................................. G06F 11/00
(52) U.S. Cl. .................... 714/53; 714/768; 714/805
(58) Field of Search .......................... 714/9, 16, 18, 714/21, 42, 53, 768, 805

(56) References Cited

U.S. PATENT DOCUMENTS

| | | | |
|---|---|---|---|
| 3,599,146 A | * | 8/1971 | Weisbecker ................. 714/805 |
| 4,044,337 A | * | 8/1977 | Hicks et al. .................. 714/19 |
| 4,376,300 A | | 3/1983 | Tsang |
| 4,584,681 A | | 4/1986 | Singh et al. |
| 4,604,751 A | | 8/1986 | Aichelmann, Jr. et al. |
| 5,058,115 A | | 10/1991 | Blake et al. |
| 5,077,737 A | | 12/1991 | Leger et al. |
| 5,164,944 A | | 11/1992 | Benton et al. |
| 5,173,905 A | | 12/1992 | Parkinson et al. |
| 5,182,752 A | * | 1/1993 | DeRoo et al. ............... 714/758 |
| 5,228,046 A | | 7/1993 | Blake et al. |
| 5,233,614 A | | 8/1993 | Singh |
| 5,255,226 A | | 10/1993 | Ohno et al. |
| 5,276,834 A | | 1/1994 | Mauritz et al. |
| 5,291,496 A | | 3/1994 | Andaleon et al. |
| 5,392,302 A | | 2/1995 | Kemp et al. |
| 5,453,999 A | * | 9/1995 | Michaelson et al. ........ 714/805 |
| 5,490,155 A | | 2/1996 | Abdoo et al. |
| 5,502,675 A | | 3/1996 | Kohno et al. |
| 5,509,119 A | * | 4/1996 | La Fetra ...................... 714/52 |
| 5,640,353 A | | 6/1997 | Ju |
| 5,682,394 A | | 10/1997 | Blake et al. |
| 5,751,740 A | | 5/1998 | Helbig, Sr. |
| 5,758,056 A | | 5/1998 | Barr |
| 5,822,257 A | | 10/1998 | Ogawa |
| 5,872,790 A | | 2/1999 | Dixon |
| 5,909,541 A | | 6/1999 | Sampson et al. |
| 5,923,682 A | | 7/1999 | Seyyedy |
| 5,928,367 A | | 7/1999 | Nelson et al. |
| 5,936,844 A | | 8/1999 | Walton |
| 5,944,838 A | * | 8/1999 | Jantz ............................ 714/6 |

(Continued)

FOREIGN PATENT DOCUMENTS

GB A-2125590 8/1983

OTHER PUBLICATIONS

International search report application No. PCT/US03/03388 mailed Mar. 29, 2004.

*Primary Examiner*—Robert Beausoliel
*Assistant Examiner*—Gabriel L. Chu
(74) *Attorney, Agent, or Firm*—Meyertons Hood Kivlin Kowert & Goetzel, P.C.; B. Noël Kivlin; Stephen J. Curran

(57) ABSTRACT

A memory subsystem includes a memory controller coupled to a memory module including a plurality of memory chips via a memory bus. The memory controller may generate a plurality of memory requests each including address information and corresponding error detection information. The corresponding error detection information is dependent upon said address information. The memory module may receive each of the plurality of memory requests. An error detection circuit within the memory module may detect an error the address information based upon the corresponding error detection information and may provide an error indication in response to detecting the error.

30 Claims, 3 Drawing Sheets

U.S. PATENT DOCUMENTS

| | | | |
|---|---|---|---|
| 5,944,843 A | * | 8/1999 | Sharma et al. ............... 714/701 |
| 5,953,265 A | | 9/1999 | Walton et al. |
| 5,978,952 A | | 11/1999 | Hayek et al. |
| 5,987,628 A | | 11/1999 | Von Bokern et al. |
| 6,003,144 A | | 12/1999 | Olarig et al. |
| 6,009,548 A | | 12/1999 | Chen et al. |
| 6,018,817 A | | 1/2000 | Chen et al. |
| 6,038,680 A | | 3/2000 | Olarig |
| 6,044,483 A | | 3/2000 | Chen et al. |
| 6,052,818 A | | 4/2000 | Dell et al. |
| 6,065,102 A | | 5/2000 | Peters et al. |
| 6,070,255 A | | 5/2000 | Dell et al. |
| 6,076,182 A | | 6/2000 | Jeddeloh |
| 6,101,614 A | | 8/2000 | Gonzales et al. |
| 6,115,828 A | | 9/2000 | Tsutsumi et al. |
| 6,141,789 A | | 10/2000 | Cypher |
| 6,158,025 A | | 12/2000 | Brisse et al. |
| 6,167,495 A | | 12/2000 | Keeth et al. |
| 6,181,614 B1 | | 1/2001 | Aipperspach et al. |
| 6,209,113 B1 | | 3/2001 | Roohparvar |
| 6,223,301 B1 | | 4/2001 | Santeler et al. |
| 6,233,717 B1 | | 5/2001 | Choi |
| 6,246,616 B1 | | 6/2001 | Nagai et al. |
| 6,308,297 B1 | | 10/2001 | Harris |
| 6,742,159 B2 | * | 5/2004 | Sakurai ..................... 714/801 |
| 2001/0001158 A1 | | 5/2001 | Tetrick |

* cited by examiner

MEMORY SUBSYSTEM INCLUDING AN ERROR DETECTION MECHANISM FOR ADDRESS AND CONTROL SIGNALS

BACKGROUND OF THE INVENTION

1. Field of the Invention

This invention relates to computer system reliability and, more particularly, to the detection of errors in memory subsystems.

2. Description of the Related Art

Computer systems are typically available in a range of configurations which may afford a user varying degrees of reliability, availability and serviceability (RAS). In some systems, reliability may be paramount. Thus, a reliable system may include features designed to prevent failures. In other systems, availability may be important and so systems may be designed to have significant fail-over capabilities in the event of a failure. Either of these types of systems may include built-in redundancies of critical components. In addition, systems may be designed with serviceability in mind. Such systems may allow fast system recovery during system failures due to component accessibility. In critical systems, such as high-end servers and some multiple processor and distributed processing systems, a combination of the above features may produce the desired RAS level.

Depending on the type of system, data that is stored in system memory may be protected from corruption in one or more ways. One such way to protect data is to use error detection and/or error correction codes (ECC). The data may be transferred to system memory with an associated ECC code which may have been generated by a sending device. ECC logic may then regenerate and compare the ECC codes prior to storing the data in system memory. When the data is read out of memory, the ECC codes may again be regenerated and compared with the existing codes to ensure that no errors have been introduced to the stored data.

In addition, some systems may employ ECC codes to protect data that is routed through out the system. However, in systems where a system memory module such as for example, a dual in-line memory module (DIMM) is coupled to a memory controller, the data bus and corresponding data may be protected as described above but the address, command and control information and corresponding wires may not. In such systems, a bad bit or wire which conveys erroneous address or command information may be undetectable as such an error. For example, correct data may be stored to an incorrect address or data may not be actually written to a given location. When the data is read out of memory, the ECC codes for that data may not detect this type of error, since the data itself may be good. When a processor tries to use the data however, the results may be unpredictable or catastrophic.

SUMMARY OF THE INVENTION

Various embodiments of a memory subsystem are disclosed. In one embodiment, a memory subsystem includes a memory controller coupled to a memory module including a plurality of memory chips via a memory bus. The memory controller may generate a plurality of memory requests each including address information and corresponding error detection information. The corresponding error detection information may be dependent upon the address information. A memory module may receive each of the plurality of memory requests. An error detection circuit within the memory module may detect an error in the address information based upon the corresponding error detection information and may provide an error indication in response to detecting the error.

In another embodiment, a memory subsystem includes a memory controller coupled to a memory module including a plurality of memory chips via a memory bus. The memory controller may generate a plurality of memory requests each including control information and corresponding error detection information. The corresponding error detection information may be dependent upon the control information. A memory module may receive each of the plurality of memory requests. An error detection circuit within the memory module may detect an error in the control information based upon the corresponding error detection information and may provide an error indication in response to detecting the error.

Figure 1:
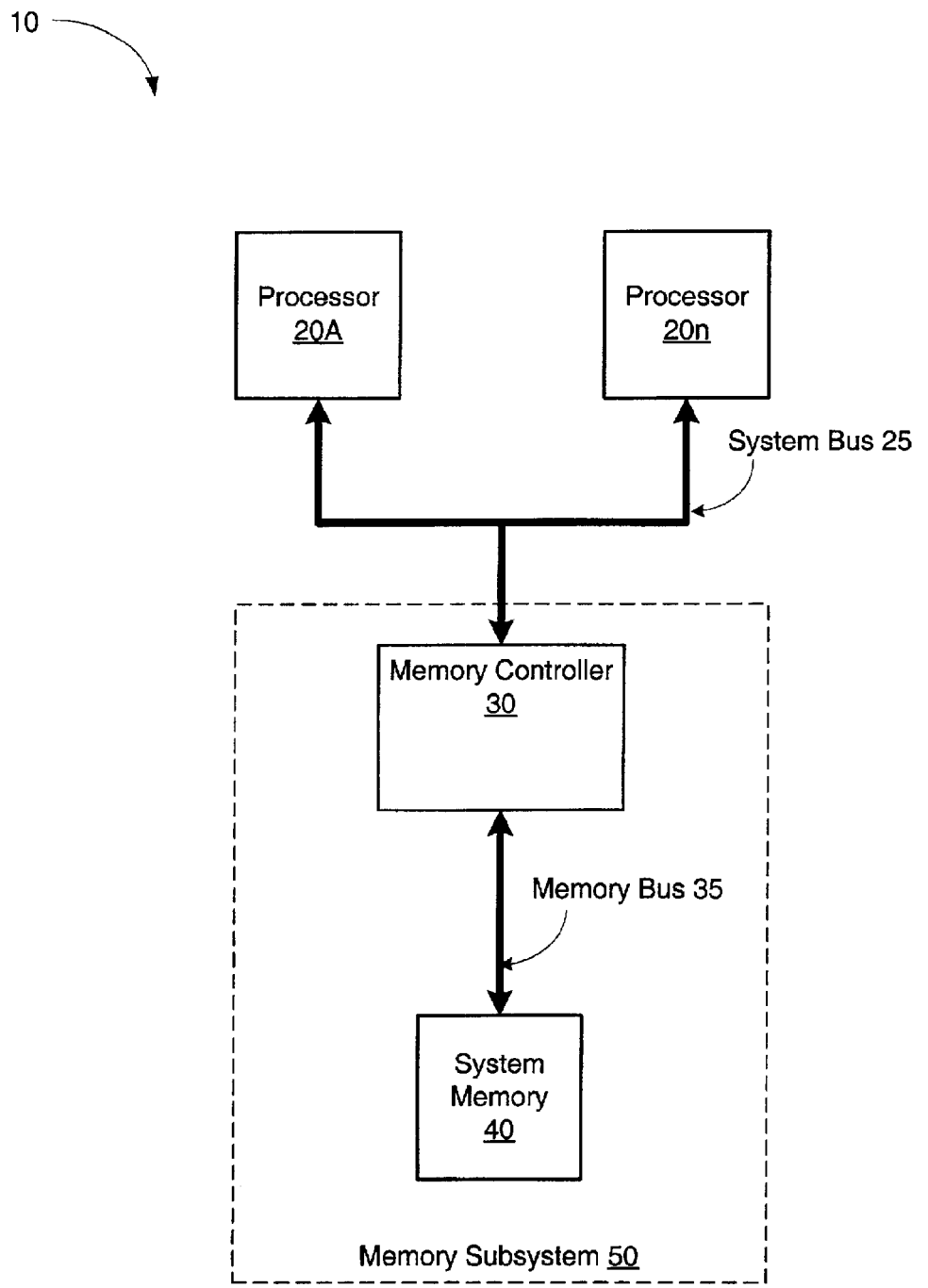
FIG. 1 is a block diagram of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Turning now to FIG. 1, a block diagram of one embodiment of a computer system 10 is shown. Computer system 10 includes a plurality of processors 20–20n connected to a memory subsystem 50 via a system bus 25. Memory subsystem 50 includes a memory controller 30 coupled to a system memory 40 via a memory bus 35. It is noted that, although two processors and one memory subsystem are shown in FIG. 1, embodiments of computer system 10 employing any number of processors and memory subsystems are contemplated. In addition, elements referred to herein with a particular reference number followed by a letter may be collectively referred to by the reference number alone. For example, processor 20A-n may be collectively referred to as processor 20.

Memory subsystem 30 is configured to store data and instruction code within system memory 40 for use by processor 20. As will be described further below, in one embodiment, system memory 40 may be implemented using a plurality of dual in-line memory modules (DIMM). Each DIMM may employ a plurality of random access memory chips such as dynamic random access memory (DRAM) or synchronous dynamic random access memory (SDRAM) chips, for example. Although it is contemplated that other types of memory may be used. Each DIMM may be mated to a system memory board via an edge connector and socket arrangement. The socket may be located on a memory subsystem circuit board and each DIMM may have an edge connector which may be inserted into the socket, for example.

Generally speaking, processor 20 may access memory subsystem 50 by initiating a memory request transaction such as a memory read or a memory write to memory controller 30 via system bus 25. Memory controller 30 may then control the storing to and retrieval of data from system memory 40 by issuing memory request commands to system memory 40 via memory bus 35. Memory bus 35 conveys address and control information and data to system memory 40. The address and control information may be conveyed to each DIMM in a point-to-multipoint arrangement while the data may be conveyed directly between each memory chip on each DIMM in a point-to-point arrangement. The point-to-multipoint arrangement is sometimes referred to as a multi-drop topology.

Figure 2:
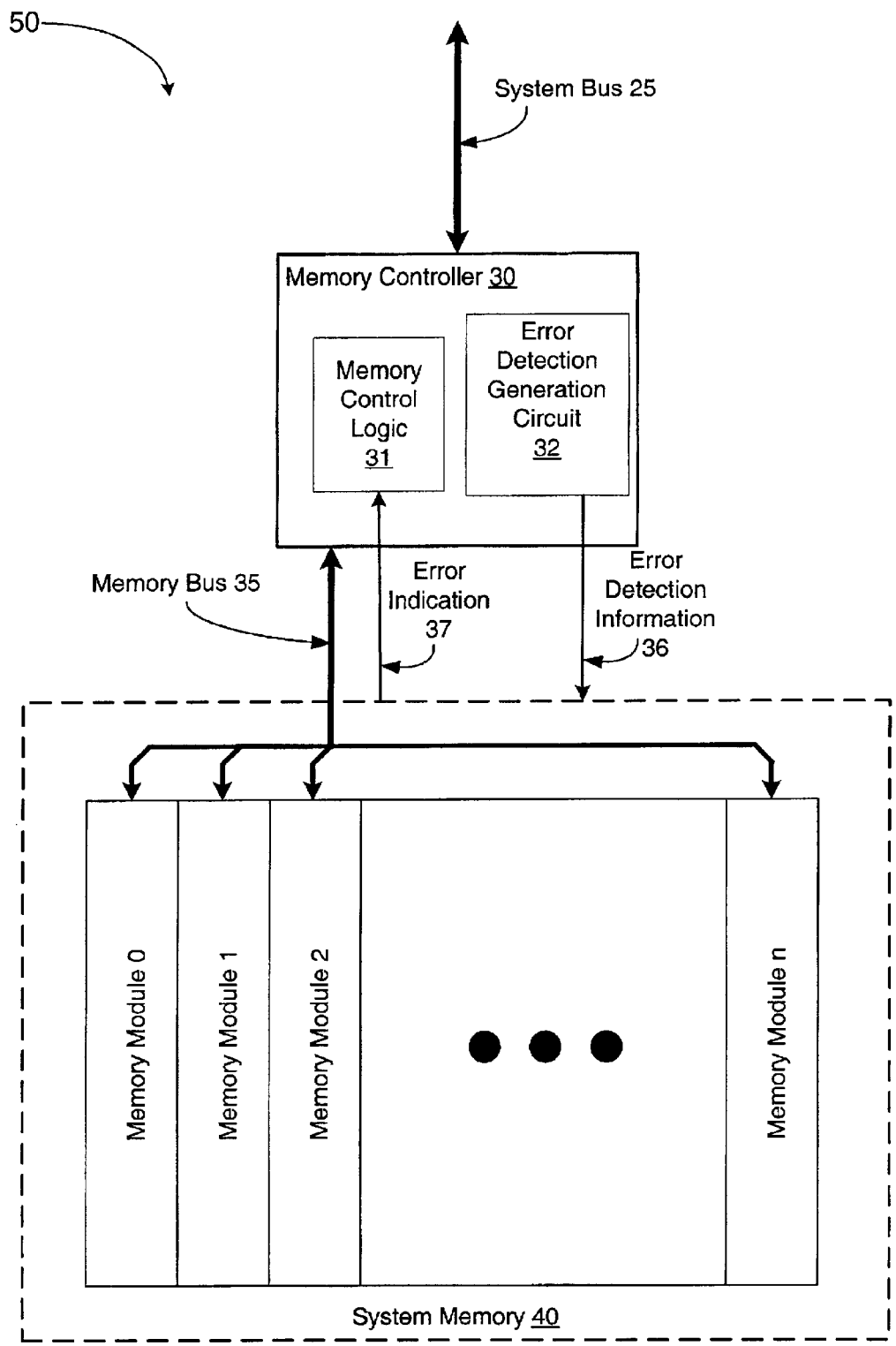
FIG. 2 is a block diagram of one embodiment of a memory subsystem.

Referring to FIG. 2, a block diagram of one embodiment of a memory subsystem is shown. Circuit components that correspond to components shown in FIG. 1 are numbered identically for clarity and simplicity. In FIG. 2, memory subsystem 50 includes a memory controller 30 coupled to a system memory 40 via a memory bus 35. Memory controller 30 includes a memory control logic unit 31 and an error detection generation circuit 32. In addition to memory bus 35, two additional signals are conveyed between memory controller 30 and system memory 40: error detection information 36 and error indication 37. As mentioned above, system memory 40 includes a plurality of memory modules depicted as memory modules 0 through n, where n is representative of any number of memory modules.

In the illustrated embodiment, memory controller 30 may receive a memory request via system bus 25. Memory controller logic 31 may then schedule the request and generate a corresponding memory request for transmission on memory bus 35. The request may include address and control information. For example, if the memory request is a memory read, memory control logic 31 may generate one or more requests that include the requested address within system memory and corresponding control information such as such as start-read or pre-charge commands, for example.

In addition to the address and control information, the request may include error detection information such as parity information, for example. In such an embodiment, the error detection information may include one or more parity bits which are dependent upon and protect the address and control information that is transmitted from the memory controller 30 to the memory module(s). It is noted that similar to the address and control information, the error detection information may be sent to each memory module in a point-to-multipoint arrangement. Error detection generation circuit 32 may be configured to generate the error detection information. It is noted that in an alternative embodiment, the error detection information may be transmitted independently of the request. It is noted that in other embodiments, the error detection information may include other types of error detection codes such as a checksum or a cyclic redundancy code (CRC), for example. Further, it is noted that in yet other embodiments, the error detection information may be an error correction code such as a Hamming code, for example. In such an embodiment, error detection circuit 130 may be configured to detect and correct errors associated with received memory requests.

In the illustrated embodiment, system memory 40 includes memory module 0 through memory module n. Depending on the system configuration, the memory modules may be grouped into a number of memory banks such that a given number of modules may be allocated to a given range of addresses. Each signal of memory bus 35 may be coupled to each of memory modules 0 through n. Control logic (not shown in FIG. 2) within each memory module may control which bank responds to a given memory request. It is noted that in an alternative embodiment, the address and command signals may be duplicated and routed among the memory modules to reduce loading effects.

Figure 3:
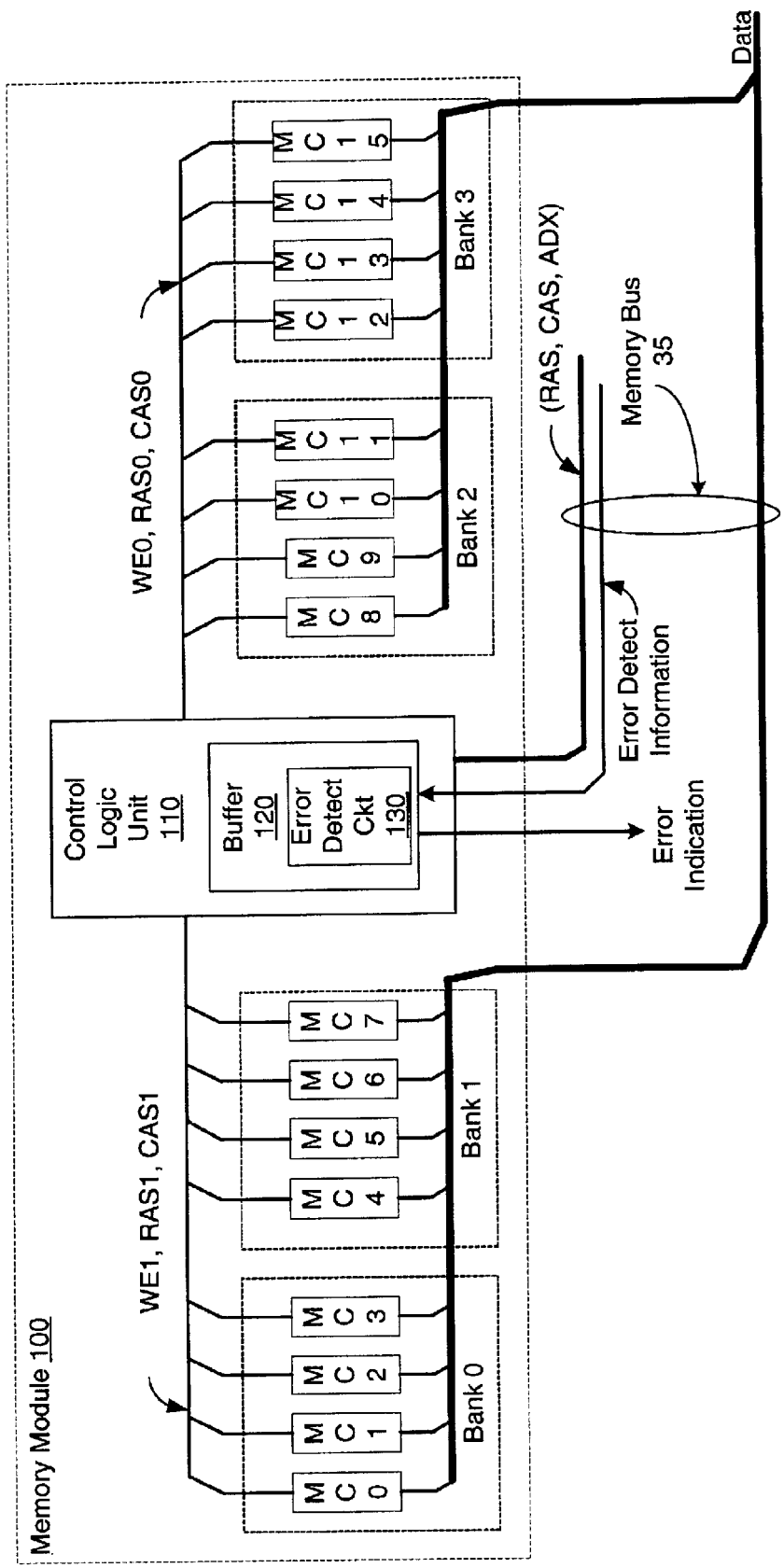
FIG. 3 is a block diagram of one embodiment of a memory module.

Turning to FIG. 3, a block diagram of one embodiment of a memory module is shown. Memory module 100 includes a control logic unit 110 which is coupled to sixteen memory chips, labeled MC 0–15. Memory chips 0–15 are logically divided into four banks, labeled 0–3. Memory bus 35 conveys address and control information and data to memory module 100. The address and control signals are routed to control logic unit 110. The data path is routed directly to memory chips 0–15. Control logic unit 110 includes a buffer 120. Buffer 120 includes an error detection circuit 130. It is noted that although sixteen memory chips are shown, it is contemplated that other embodiments may include more or less memory chips. Although, it is noted that four banks are described, other embodiments are contemplated in which other numbers of memory banks are used including accessing memory chips 0–15 as one bank.

As described above, in one embodiment, the memory chips may be implemented in DRAM. To access a location in a DRAM, an address must first be applied to the address inputs. This address is then decoded, and data from the given address is accessed. The rows and columns may be addressed separately using row address strobe (RAS) and column address strobe (CAS) control signals. By using RAS and CAS signals, row and column addresses may be time-multiplexed on common signal lines, contact pads, and pins of the address bus. To address a particular memory location in a DRAM as described above, a RAS signal is asserted on the RAS input of the DRAM, and a row address is forwarded to row decode logic on a memory chip. The contents of all locations in the addressed row will then be sent to a column decoder, which is typically a combination multiplexer/demultiplexer. After row addressing is complete, a CAS signal is asserted, and a column address is sent to the column decoder. The multiplexer in the column decoder will then select the corresponding column from the addressed row, and the data from that specific row/column address is placed on the data bus for use by the system.

Control logic unit 110 receives memory requests via memory bus 35. As described above, a memory request may include address information such as the row address and the column address designated ADX, control information such as the RAS and CAS and error detection information. Each received request may be temporarily stored in buffer 120. Control logic unit 110 may generate appropriate control signals for accessing the appropriate bank of memory chips. In the illustrated embodiment, for example, write enables (WE0, WE1, WE2, WE3), row address strobes (RAS0, RAS1, RAS2, RAS3) and column address strobes (CAS0, CAS1, CAS2, CAS3) may be generated by control logic unit 110 dependent upon the received address and control information. It is noted that dependent upon the type of memory chips used (e.g. SDRAM), the control information received via memory bus 35 and generated by control logic unit 110 may include other signals (not shown).

In addition, error detection circuit 130 generates new error detection information dependent upon the address and command information received with each request. The new error detection information is compared with the received error detection information to determine if there is an error present in the request. If an error is detected, error detection circuit 130 may transmit an error indication to memory controller 30 of FIG. 2. However it is noted that in other embodiments, error detection circuit 130 may transmit the error indication to processor 20 or to a diagnostic subsystem (not shown) to indicate the presence of an error. It is noted that error detection circuit 130 may be implemented in any of a variety of circuits such as combinatorial logic, for example. It is noted that in one embodiment, the error indication may be sent from each memory module to memory controller 30 in a point-to-point arrangement, thus allowing memory controller 30 to determine which memory module has detected an error.

Depending on the configuration of system memory 40, the error may be isolated to a particular memory module, signal trace or wire. In one embodiment, the diagnostic processing subsystem may determine the cause of the error. The diagnostic processing subsystem may further isolate and shut down the failing component, or the diagnostic processing subsystem may reroute future memory requests. In other embodiments, the diagnostic subsystem may determine the cause of the error and run a service routine which may notify repair personnel.

If the current memory request is a read, error detection circuit 130 may send the error indication to memory controller 30 and control logic 110 may only send the error indication and not return any data. In response to receiving the error indication, memory control logic 31 may return a predetermined data value to processor 20 in response to receiving the error indication. Thus, in one embodiment, processor 20 may systematically abort any process which depends on that particular data. In one embodiment, the predetermined data value may be a particular data pattern that processor 20 may recognize as possibly erroneous data. In an alternative embodiment, the data may be accompanied by a bit which identifies to processor 20 that the data has an error.

If the current memory request is a write, error detection circuit 130 may send the error indication to memory controller 30, thus notifying memory controller 30 that the data written to memory may have an error. In an alternative embodiment, in addition to sending the error indication to memory controller 30, error detection circuit 130 may also cause control logic unit 110 to inhibit generation of any write enable signals thus preventing data from being written into memory chips 0–15.

Referring collectively to FIG. 2 and FIG. 3, memory control logic 31 receives the error indication from system memory 40. In response to receiving the error indication, memory control logic 31 may store status information such as the address being written to or read from and the error indication, for example. The status information may be used in determining the cause of the error. In addition, memory control logic 31 may issue an interrupt to the diagnostic processing subsystem (not shown) or alternatively to processor 20.

It is noted that in an alternative embodiment, memory control logic 31 may include a history buffer (not shown) which stores a predetermined number of past memory transactions. Thus, if error detection circuit 130 detects an error in a received request the first time that request is received, control logic 110 may inhibit writing any data to memory chips 0–15. Further, control logic 110 may send the error indication to memory control logic 31 a predetermined number of cycles after the error was detected. In response to receiving the error indication, memory control logic 31 may know how many cycles ago the error occurred. Memory control logic 31 may access the history buffer and send the correct number of past memory transactions to system memory 40. If an error is detected while resending the transactions in the history buffer, control logic 110 may inhibit generation of any write enable signals to memory banks 0–3, thus preventing data from being written into memory chips 0–15. Control logic 110 may then send the error indication to memory control logic 31 a second time. Memory control logic 31 may then send an interrupt as described previously above.

It is noted that in one embodiment, memory bus 35 may convey address and control information in packets. In such an embodiment, the error detection information may protect the address and control information conveyed in each packet.

However in an alternative embodiment, it is contemplated that memory bus 35 may convey address, control and error detection information in a conventional shared bus implementation. In such an embodiment, the error detection information may protect the address and control information during each address and/or clock cycle.

Numerous variations and modifications will become apparent to those skilled in the art once the above disclosure is fully appreciated. It is intended that the following claims be interpreted to embrace all such variations and modifications.

What is claimed is:

1. A memory subsystem comprising:
 a memory controller configured to generate a plurality of memory requests each including address information and control information, and corresponding error detection information dependent upon said address information and said control information; and
 a memory module including a plurality of memory chips for storing data, wherein said memory module is coupled to receive said plurality of memory requests;
 wherein said memory module further includes an error detection circuit configured to detect an error in said address information and said control information based on said corresponding error detection information and to provide an error indication in response to detecting said error.

2. The memory subsystem as recited in claim 1, wherein said corresponding error detection information includes a parity bit.

3. The memory subsystem as recited in claim 1, wherein said corresponding error detection information is an error correction code.

4. The memory subsystem as recited in claim 1, wherein said error detection circuit is further configured to generate a second error detection information based upon a given received memory request and to compare said second error detection information to said corresponding error detection information to detect said error.

5. The memory subsystem as recited in claim 1, wherein if a given memory request is a memory read request, said memory controller is further configured to provide a predetermined data value in response to receiving said error indication.

6. The memory subsystem as recited in claim 1, wherein if a given memory request is a memory write request, said memory module is further configured to inhibit writing data to said plurality of memory chips in response to detecting said error.

7. The memory subsystem as recited in claim 1, wherein said memory module is further configured to provide said error indication a predetermined number of cycles after detecting said error.

8. The memory subsystem as recited in claim 7, wherein said memory controller is further configured to store a predetermined number of past memory requests in a buffer.

9. The memory subsystem as recited in claim 8, wherein said memory controller is further configured to send each of said predetermined number of past memory requests to said memory module in response to receiving said error indication.

10. The memory subsystem as recited in claim 1, wherein said memory controller is further configured to store status information in response to receiving said error indication.

11. The memory subsystem as recited in claim 10, wherein said status information includes said address information.

12. The memory subsystem as recited in claim 11, wherein said status information includes said control information.

13. The memory subsystem as recited in claim 1, wherein said memory controller is further configured to provide an interrupt to a diagnostic subsystem in response to receiving said error indication.

14. The memory subsystem as recited in claim 1, wherein said memory module is a dual in-line memory module (DIMM).

15. A computer system comprising:
    a processor;
    a memory subsystem coupled to said processor, said memory subsystem including:
        a memory controller configured to generate a plurality of memory requests each including address information and control information, and corresponding error detection information dependent upon said address information and said control information; and
        a memory module including a plurality of memory chips for storing data, wherein said memory module is coupled to receive said plurality of memory requests;
    wherein said memory module further includes an error detection circuit configured to detect an error in said address information and said control information based on said corresponding error detection information and to provide an error indication in response to detecting said error.

16. The computer system as recited in claim 15, wherein said corresponding error detection information includes a parity bit.

17. The computer system as recited in claim 15, wherein said corresponding error detection information is an error correction code.

18. The computer system as recited in claim 15, wherein said error detection circuit is further configured to generate a second error detection information based upon a given received memory request and to compare said second error detection information to said corresponding error detection information to detect said error.

19. The computer system as recited in claim 15, wherein if a given memory request is a memory read request, said memory controller is further configured to provide a predetermined data value in response to receiving said error indication.

20. The computer system as recited in claim 15, wherein if a given memory request is a memory write request, said memory module is further configured to inhibit writing data to said plurality of memory chips in response to detecting said error.

21. The computer system as recited in claim 15, wherein said memory module is further configured to provide said error indication a predetermined number of cycles after detecting said error.

22. The computer system as recited in claim 21, wherein said memory controller is further configured to store a predetermined number of past memory requests in a buffer.

23. The computer system as recited in claim 22, wherein said memory controller is further configured to send each of said predetermined number of past memory requests to said memory module in response to receiving said error indication.

24. The computer system as recited in claim 15, wherein said memory controller is further configured to store status information in response to receiving said error indication.

25. The computer system as recited in claim 24, wherein said status information includes said address information.

26. The computer system as recited in claim 25, wherein said status information includes said control information.

27. The computer system as recited in claim 15, wherein said memory controller is further configured to provide an interrupt to a diagnostic subsystem in response to receiving said error indication.

28. The computer system as recited in claim 15, wherein said memory module is a dual in-line memory module (DIMM).

29. A method comprising:
    generating a plurality of memory requests each including address information and control information, and corresponding error detection information dependent upon said address information and said control information; and
    a memory module receiving each of said plurality of memory requests;
    said memory module detecting an error in said address information and said control information based on said corresponding error detection information; and
    said memory module providing an error indication in response to detecting said error.

30. A memory subsystem comprising:
    means for generating a plurality of memory requests each including address information and control information, and corresponding error detection information dependent upon said address information and said control information; and
    a memory module coupled for receiving each of said plurality of memory requests, wherein said memory module includes:
        means for detecting an error in said address information and said control information based on said corresponding error detection information; and
        means for providing an error indication in response to detecting said error.

* * * * *